US009003366B2

(12) United States Patent
Zeidman (10) Patent No.: US 9,003,366 B2
(45) Date of Patent: *Apr. 7, 2015

(54) DETECTING PLAGIARISM IN COMPUTER SOURCE CODE

(75) Inventor: Robert Marc Zeidman, Cupertino, CA (US)

(73) Assignee: Software Analysis and Forensic Engineering Corporation, Cupertino, CA (US)

( * ) Notice: Subject to any disclaimer, the term of this patent is extended or adjusted under 35 U.S.C. 154(b) by 793 days.

This patent is subject to a terminal disclaimer.

(21) Appl. No.: 12/871,808

(22) Filed: Aug. 30, 2010

(65) Prior Publication Data

US 2010/0325614 A1    Dec. 23, 2010

Related U.S. Application Data

(63) Continuation of application No. 12/330,492, filed on Dec. 8, 2008, now Pat. No. 7,823,127, which is a continuation-in-part of application No. 10/720,636, filed on Nov. 25, 2003, now Pat. No. 7,503,035.

(51) Int. Cl.
| | | |
|---|---|---|
| G06F 9/44 | (2006.01) | |
| G06F 21/10 | (2013.01) | |
| G06F 17/22 | (2006.01) | |
| G06Q 10/10 | (2012.01) | |

(52) U.S. Cl.
CPC ............. *G06F 21/105* (2013.01); *G06F 8/751* (2013.01); *G06F 8/73* (2013.01); *G06F 17/2211* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 4,385,371 A | 5/1983 | Shafer et al. | |
| 6,282,698 B1 * | 8/2001 | Baker et al. | 717/118 |
| 6,493,709 B1 | 12/2002 | Aiken | |
| 6,658,648 B1 | 12/2003 | Douceur et al. | |
| 6,976,170 B1 * | 12/2005 | Kelly | 713/181 |
| 6,978,419 B1 | 12/2005 | Kantrowitz | |
| 7,219,301 B2 | 5/2007 | Barrie et al. | |
| 7,493,596 B2 * | 2/2009 | Atkin et al. | 717/124 |
| 7,568,109 B2 | 7/2009 | Powell, Jr. et al. | |
| 2004/0030676 A1 * | 2/2004 | Wagner | 707/2 |
| 2004/0230964 A1 | 11/2004 | Waugh et al. | |
| 2006/0129523 A1 | 6/2006 | Roman et al. | |
| 2007/0136698 A1 * | 6/2007 | Trujillo et al. | 716/1 |

OTHER PUBLICATIONS

Spafford et al. "Software Forensics: Can We Track Code to Its Authors?", 1992, Technical Report, Department of Computer Science, Purdue University.*
J Howard Johnson, "Substring Matching for Clone Detection and Change Tracking", 1994, Software Engineering Laboratory, National Research Council of Canada.*
Joy et al. "Plagiarism in Programming Assignments" , 1999, IEEE Transactions on Education, vol. 42, No. 2, pp. 129-133.*
Lucca et al. "An Approach to Identify Duplicated Web Pages", 2002, COMPSAC 2002.*

(Continued)

*Primary Examiner* — Jue Louie
(74) *Attorney, Agent, or Firm* — Blakely, Sokoloff, Taylor & Zafman LLP (57) ABSTRACT

Plagiarism is detected by comparing statements within source code of a first program to comments within source code of a second program.

15 Claims, 7 Drawing Sheets

(56) References Cited

OTHER PUBLICATIONS

Hart et al. "Sherlock User Manual", Nov. 2002, retrieved from: http://web.archive.org/web/20030510140152/http://www.dcs.warwick.ac.uk/boss/manuals/sherlock.htm.*

Pike et al. "Sherlock: Plagiarism Detector", 2002, retrieved from: http://web.archive.org/web/20020804114150/http://www.cs.usyd.edu.au/~scilect/sherlock/.*

ICSharpeCode.net, "A matter of inspiratino?", Oct. 2003, retrieved from: http://web.archive.org/web/20031020055356/http://www.icsharpcode.net/pub/relations/amatterofinspiration.aspx.*

Engels et al. "Plagiarism Detection Using Feature-Based Neural Networks", 2007, SIGCSE'07.*

"Emacs", Jul. 18, 2007, Wikipedia Encyclopedia, Accessed and printed online on Jul. 24, 2007 at <http://en.wikipedia.org/wiki/Emacs>, 8 pages.

Arnow, D. 1995. "When you grade that: using e-mail and the network in programming courses", In Proceedings of the 1995 ACM Symposium on Applied Computing (Nashville, Tennessee, United States, Feb. 26-28, 1995). K. M. George, J. Carroll, and D. Oppenheim, Eds. SAC '95. ACM Press, New York, NY, 10-13.

Arwin et al. "Plagiarism Detection across Programming Languages", 2006, Proceedings of the 29th Australasian Computer Science Conference, vol. 48.

Baker, "On finding Duplication and Near Duplication in Large Software Systems", 1995, Reverse Engineering, 1995.

Culwin et al. "Source Code Plagiarism in UK HE Computing Schools, Issues, Attitudes and Tools", Sep. 2001, South Bank University, London, Technical Report SBU-CISM-01-01, 34 pages.

Geoff Whale, "Identification of Program Similarity in Large Populations," The Computer Journal, vol. 33, No. 2, 1990.

Hunt et al. "An Algorithm for Differential File Comparison", 1976, Computer Science Technical Report 41, AT&T Bell Laboratories.

Johnson, M. K. 1996. Diff, Patch, and Friends. Linux J. 1996, 28es (Aug. 1996), Article 2, 9 pages.

Kilgour et al. "A Fuzzy Logic Approach to Computer Science Software Source Code Authorship Analysis", 1997, Fourth International Conference on Neural Information Processing—The Annual Conference of the Asian Pacific Neural Network Assembly.

Lutz Prechelt et al., "Finding Plagiarisms among a Set of Programs with JPlag," Journal of Universal Computer Science, vol. 8, No. 11, 2002.

Marcus et al. "Identification of High-Level Concept Clones in Source Code", 2001, Automated Software Engineering, (ASE 2001).

Michael J. Wise, "YAP3: Improved detection of similarities in computer program and other texts," SIGCSE '96, Philadelphia, PA, USA, Feb. 15-17, 1996, pp. 130-134.

Michael Wise, "String Similarity via Greedy String Tiling and Running Karp.Rabin Matching," Department of Computer Science Technical Report, Sydney University, 1993.

Paul Clough, Plagiarism in natural and programming languages: an overview of current tools and technologies, Jul. 2000, Research Memoranda, CS-00-05, University of Sheffield, UK., 31 pages.

Paul Heckel, "A Technique for Isolating Differences Between Files," Communications of the ACM 21(4), Apr. 1978, pp. 264-268.

Peer to Patent prior art submission report for 7568109, Sep. 18, 2009, 3 pages.

Print pub: UNIX diff command/utility; James Hunt; Jan. 1, 1976, 3 pages.

Saul Schleimer et al., "Winowing: Local Algorithms for Document Fingerprinting," SIGMOD 2003, San Diego, CA, USA, Jun. 9-12, 2003.

Si, A., Leong, H. V., and Lau, R. W. 1997. Check: a document plagiarism detection system. In Proceedings of the 1997 ACM Symposium on Applied Computing (San Jose, California, United States). B. Bryant, J. Carroll, J. Hightower, and K. M. George, Eds. SAC '97. ACM Press, New York, NY, 70-77.

Thomas H. Cormen et al., Introduction to Algorithms, MIT Press, 1990.

Verco and Wise, "Software for detecting suspected plagiarism: comparing structure and attribute-counting systems" 1996, ACM, ACSE '96 Proceedings of the 1st Australasian conference on Computer science education.

Wegmann, TLA+ Mode, Product Documentation, Archived May 24, 2003 at <http://web.archive.org/web/20030524052123/http://www4.cs.uni-dortmund-.de/RVS/P-TLA/TEM/doc/tla-mode.sub.--4.html>, Accessed and printed Mar. 26, 2007, 8 pages.

Worthington, "Strings", Princeton University, COS 126 Precept Notes, Archived Oct. 3, 2000 at <http://web.archive.org/web/20001003053028/http://www.cs.princeton.edu/~lworthin/126/precepts/strings.html>.

Zeidman, Bob, "Detecting Source-Code Plagiarism" Jun. 1, 2004, Cmp Technology, Dr. Dobb's Journal, accessed and printed Mar. 23, 2007 at <http://www.ddj.com/dept/architect/184405734>.

Zeidman, R., Software Source Code Correlation, Computer and Information Science, 2006. ICIS-COMSAR 2006. 5th IEEE/ACIS International Conference on Jul. 10-12, 2006, pp. 383-392.

Lutz Prechelt, et al., JPlag: Finding plagiarisms among a set of programs. Technical Report 2001-1, Mar. 28, 2000, 44 pages.

Non-Final Office Action for U.S. Appl. No. 12/330,492, mailed Nov. 23, 2009, 10 pages.

Final Office Action for U.S. Appl. No. 12/330,492, mailed May 11, 2010, 11 pages.

Notice of Allowance for U.S. Appl. No. 12/330,492, mailed Aug. 5, 2010, 1 pages.

* cited by examiner

Figure 1

```
/*    fdiv routine
      This routine is important    */
void fdiv(
    char    *fname,      // file name
    char *path)          // path
{                                            201
    int Index1, j;
    printf("hello world");
    while (1)
         j =    strlen(fname);
    /* find the file     extension */
```

CodeCross Basic Report
Version: 1.0.0
Date: 11/22/08
Time: 13:09:09
*CodeSuite copyright 2003-2008 by Software Analysis and Forensic Engineering Corporation*

600

601

SETTINGS
Compare files in folder D:\S.A.F.E\code development\CodeSuite\test\CodeCross\files 1
    Including subdirectories
To files in folder D:\S.A.F.E\code development\CodeSuite\test\CodeCross\files 2
    Including subdirectories
Programming language: C
Filetypes: *.c;*.h
Reporting file threshold: 8 files

602

D:\S.A.F.E\code development\CodeSuite\test\CodeCross\files 1\aaa_commented.c
Score Compared To File

603

100  D:\S.A.F.E\code development\CodeSuite\test\CodeCross\files 2\aaa.c
  100  D:\S.A.F.E\code development\CodeSuite\test\CodeCross\files 2\aaa_with_comments.c
  100  D:\S.A.F.E\code development\CodeSuite\test\CodeCross\files 2\abc.c
  100  D:\S.A.F.E\code development\CodeSuite\test\CodeCross\files 2\bpf_dump_semicolons.c
  100  D:\S.A.F.E\code development\CodeSuite\test\CodeCross\files 2\bpf_dump_strings.c
  100  D:\S.A.F.E\code development\CodeSuite\test\CodeCross\files 2\semicolon_test.c

D:\S.A.F.E\code development\CodeSuite\test\CodeCross\files 1\bpf_dump.c
Score Compared To File

604

100  D:\S.A.F.E\code development\CodeSuite\test\CodeCross\files 2\bpf_dump_strings.c
  100  D:\S.A.F.E\code development\CodeSuite\test\CodeCross\files 2\W32NReg_commented.c

Figure 6A

Comparing file1: 610
  D:\S.A.F.E\code development\CodeSuite\test\CodeCross\files 1\aaa_commented.c
  To file2:
  D:\S.A.F.E\code development\CodeSuite\test\CodeCross\files 2\aaa.c
  — 611

Matching statements to comments:

| File1 Line# | File2 Line# | Comment/String |
|---|---|---|
| 1<br>4 | 1<br>3<br>5 | p = null; |
| 2<br>5 | 2 | private String auxonus = null; |

DETECTING PLAGIARISM IN COMPUTER SOURCE CODE

RELATED APPLICATIONS

The present application is a continuation of U.S. patent application Ser. No. 12/330,492 filed Dec. 8, 2008 now U.S. Pat. No. 7,823,127 which is a continuation-in-part application of U.S. patent application Ser. No. 10/720,636 filed Nov. 25, 2003, now U.S. Pat. No. 7,503,035 which is incorporated herein by reference.

TECHNICAL FIELD

Embodiments of the present invention relate to software tools for comparing program source code files to detect code copied from one file to another. In particular, the present invention relates to finding pairs of source code files that have been copied, in full or in part, by detecting functional code in one file that has been commented out in another file.

BACKGROUND

Plagiarism of software source code is a serious problem in two distinct areas of endeavor—cheating by students at schools and intellectual property theft at corporations. Plagiarism detection programs and algorithms have been around for a number of years but have gotten more attention recently due to two main factors. First, the Internet and search engines like Google have made source code very easy to obtain. Second, the open source movement has grown tremendously over the past several years, allowing programmers all over the world to write, distribute, and share code.

In recent years, plagiarism detection techniques have become more sophisticated. A summary of available tools is given by Paul Clough in his paper entitled "Plagiarism in natural and programming languages: an overview of current tools and technologies." Clough discusses tools and algorithms for finding plagiarism in generic text documents as well as in programming language source code files.

There are a number of plagiarism detection programs currently available including the Plague program developed by Geoff Whale at the University of New South Wales, the YAP programs (YAP, YAP2, YAP3) developed by Michael Wise at the University of Sydney, Australia, the JPlag program, written by Lutz Prechelt and Guido Malpohl of the University Karlsruhe and Michael Philippsen of the University of Erlangen-Nuremberg, and the Measure of Software Similarity (MOSS) program developed at the University of California at Berkeley by Alex Aiken.

One deficiency of the aforementioned programs is that they only compare functional code. One program, CodeMatch®, developed by Robert Zeidman, the inventor of the present invention, overcomes this deficiency by dividing program source code into elements including functional code (statements, identifiers, and instruction sequences) and non-functional code (comments and strings) and compares these different elements in the source code files of different programs to each other.

Clever programmers will often make significant changes to the appearance, but not the functionality, of the functional source code in order to disguise copying. The resulting functional code looks very different but functions identically to the original code from which it was copied.

In cases of trying to disguise copying, a programmer may copy a function from one program's source code into another program's source code and comment it out in order to use the code as a guide for writing a similar function. Often programmers making changes to disguise functional statements do not make changes to the commented code because it is non-functional and escapes their notice. All of the previously mentioned tools will not find this sure sign of plagiarism. Accordingly, it would be beneficial to have a plagiarism detection tool that can compare functional code in one source code file to nonfunctional code in another source code file in order to overcome the above limitations of the conventional techniques.

BRIEF DESCRIPTION OF THE DRAWINGS

The present invention is illustrated by way of example, and not by way of limitation, in the figures of the accompanying drawings and in which.

DETAILED DESCRIPTION

Methods and systems for detecting copied program code based on source code are described. In one embodiment, signs of possible copying are detected by comparing source code functional statements of a first program with source code non-functional comments of a second program suspected of being copied from the first program.

Embodiments of the invention make use of a basic knowledge of programming languages and program structures to simplify the matching task, while requiring a small amount of programming language-specific information. Such programming language-specific information includes characters used to delimit comments in the particular programming language.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "communicating", "executing", "passing", "determining", "generating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-accessible medium having stored thereon instructions, which may be used to program a computer system (or other electronic devices) to perform a process according to the present invention. A machine-accessible medium includes any mechanism for storing or transmitting information in a form readable by a machine (e.g., a computer). For example, a machine-accessible (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.), etc.

Figure 1:
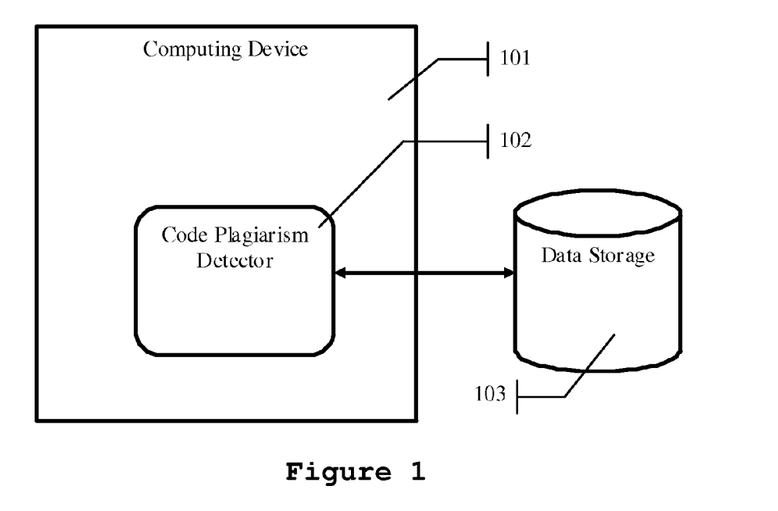
FIG. 1 illustrates a block diagram of a system for the present invention, in accordance with one embodiment of the invention.

FIG. 1 illustrates a block diagram of a system for detecting program code plagiarism in accordance with one embodiment of the invention. The system includes a computing device 101 and a data storage device 103. The data storage device 103 may be a mass storage device, such as a magnetic or optical storage based disk or tape, and may be part of the computing device 101, or be coupled with the computing device 101 directly or via a network (e.g., a public network such as the Internet or a private network such as a local area network (LAN)). The computing device 101 may be a personal computer (PC), palm-sized computing device, personal digital assistant (PDA), server, or other computing device.

The computer device 101 hosts a code plagiarism detector 102 that can detect plagiarism by examining source code of two different programs. The code plagiarism detector 102 detects plagiarism by comparing a first computer program source code file with a second computer program source code file. The files being compared may be stored in the data storage device 103.

In one embodiment, the code plagiarism detector 102 pre-processes the files being compared prior to performing the comparison. As will be discussed in more detail below, the code plagiarism detector 102 may create data structures (e.g., arrays) for the files being compared, and may store the data structures in the data storage 103. The code plagiarism detector 102 may then compare entries of the data structures, and calculate a similarity score based on the number of similar entries in the data structures, where the similarity score indicates a possibility of plagiarism. The code plagiarism detector 102 may generate a report and store it in the data storage 103 or display it to a user of the computing device 101 or some other computing device coupled to the device 101 (e.g., directly or via a network).

Figure 2A:
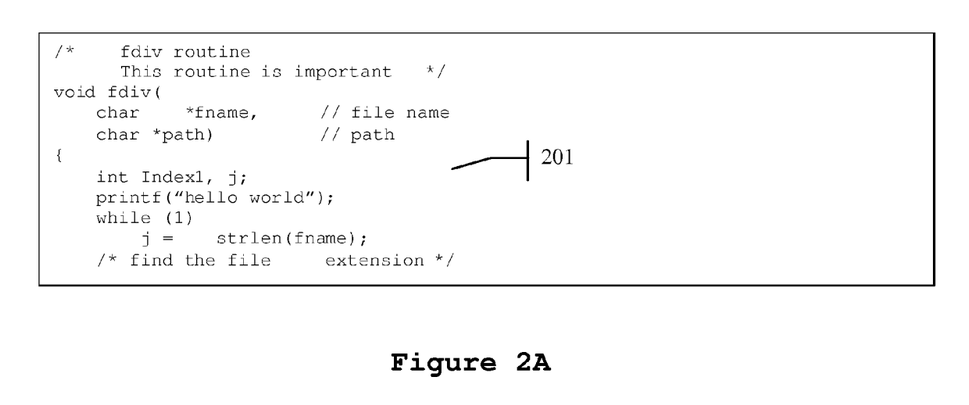
FIG. 2 illustrates dividing a file of source code into statements and comments.
Figure 2B:
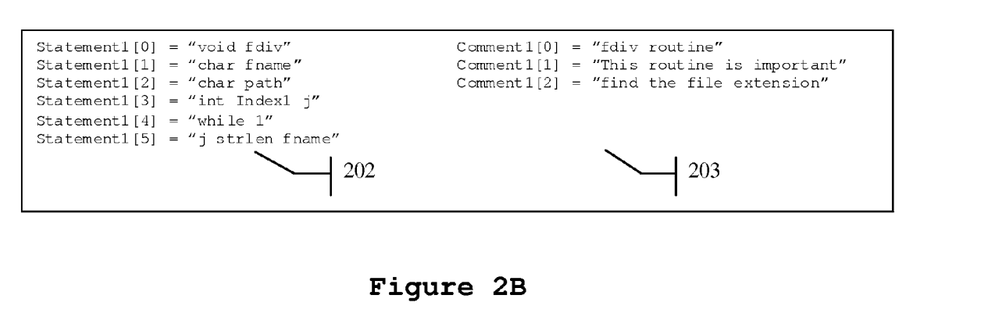

In one embodiment of the present invention, each line of two source code files is initially examined and a string array for each file is created: Statements 1[ ] is the collection of functional statements in the first file and Comments2[ ] is the collection of non-functional comments in the second file. A sample snippet 201 of a source code file to be examined is shown in FIG. 2A. The array of statements 202 and comments 203 for the code snippet 201 is shown in FIG. 2B. Note that whitespace is not removed entirely, but rather all sequences of whitespace characters are replaced by a single space in both source lines and comment lines. In this way, the individual words are preserved in the strings. Separator characters such as {,}, and ; are treated as whitespace. The comment characters themselves, in this case /*, */, and //, are stripped off from the comments. Special characters such as comment delimiters and separator characters are defined in a language definition file that is input to this embodiment of the present invention.

Figure 3:
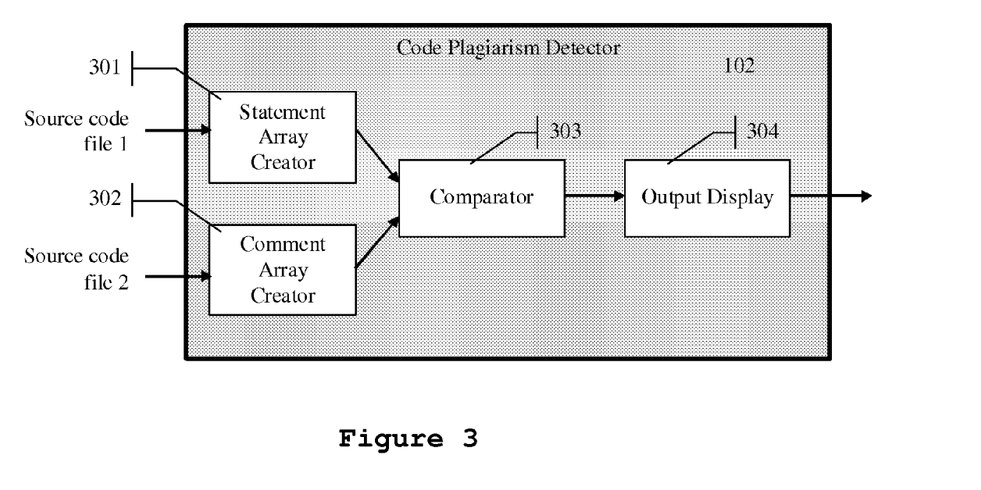
FIG. 3 illustrates the software architecture of one embodiment of the present invention.

FIG. 3 illustrates a block diagram of one embodiment of a code plagiarism detector 102 that compares a source code file of a first program with a source code file of a second program. The code plagiarism detector 102 includes statement array creator 301, comment array creator 302, comparator 303, and output display 304.

The statement array creator 301 examines lines of the source code file and creates a statement array. The statement array includes functional statements that are found in the source code. The comment array creator 302 examines lines of the source code file and creates a comment array. The comment array includes non-functional comments that are found in the source code. The comparator 303 compares the statements in the statement array to the comments in the comment array. The output display 304 takes the output of the comparator 303 and displays it to the user.

The comment array creator 302 uses a predefined list of special characters, which is programming language specific, to correctly determine the beginning and end of comments in the code in order to construct the comment array. For example, the source code file snippet 201 includes double slash characters (//) that are used to denote comments that start after the double slash and continue until the end of the line. The source code file snippet 201 also include the /* character sequence to denote the beginning of a comment and the */ character sequence to denote the end of a comment.

Once the array creators 301 and 302 create their respective arrays, the comparator 303 performs the comparison using these arrays. The comparator 303 compares each entry in the string array to each entry in the comment array. When source code is copied, functional statements are sometimes commented out and used as a guide for writing new code. Hence copied source code may contain statements that have been commented out.

This comparator 303 calculates a similarity score based on the number of statements in the first file that are similar to comments in the second file. In one embodiment, similar strings consist of exact matches. In other words, the number of matching statements and comments includes only statements and comments where each and every character in the string exactly matches the corresponding character in the text sequence.

In another embodiment, similarity score s can represent the number of matching statements and comments in the pair of arrays weighted by the number of characters in the matching lines and can be determined using the following equation:

$$s = \Sigma A_i \text{ for } i=1 \text{ to } m_s$$

where $m_s$ is the number of matching statements and $A_i$ the number of matching characters in matching statements i.

In another embodiment, similar statements and comments are not limited to exact matches and also include partial matches. It may be that in the copied source code, the statements were commented out, but in the original source code the statements went through further changes after the source code was copied. Hence, this other embodiment considers partial matches where the distance between a string and a comment is below some predefined threshold. This distance can be some well-known distance measure such as the Levenshtein distance (also known as the edit distance), the Damerau-Levenshtein distance, or the Hamming distance.

In yet another embodiment, a similarity score can be calculated as a binary value of 0 or 1. If there is at least one statement in the first source code file that is similar to one comment in the second source code file, the similarity score is 1 otherwise it is 0. This can be done because just the fact that a single statement in the first program appears as a comment in the second program is enough reason to warrant further examination. This binary calculation does not make a value judgment about the commenting, but simply directs a user to look more carefully at this suspicious phenomenon.

The output display 304 generates an output to a user such as a report that may include a list of file pairs ordered by the result of the similarity score calculated by comparator 303, as will be discussed in more detail below.

Figure 4:
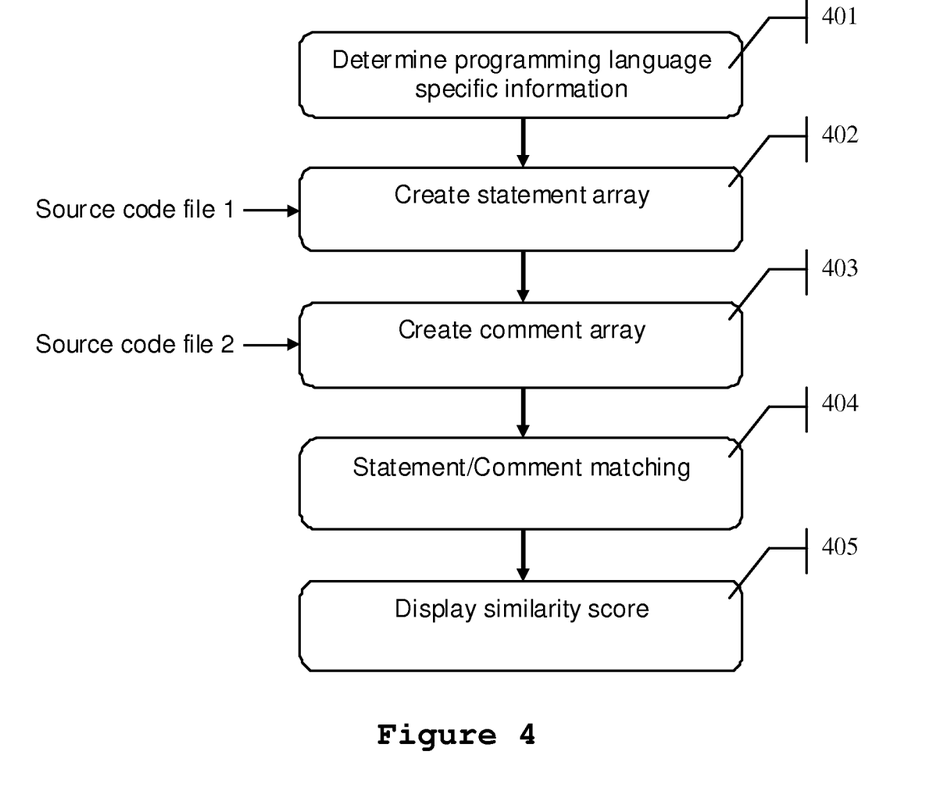
FIG. 4 illustrates a flow diagram of one embodiment of the present invention.

FIG. 4 illustrates a flow diagram of one embodiment of a method of detecting source code plagiarism. The method may be performed by processing logic that may comprise hardware (e.g., circuitry, programmable logic, microcode, etc.), software (such as instructions run on a processing device), or a combination thereof. In one embodiment, the method is performed by a code plagiarism detector (e.g., code plagiarism detector 102 of FIG. 1).

Referring to FIG. 4, the method begins with processing logic determining program language dependant information (block 401). Program language dependant information may include, for example, comment delimiter characters. Program language dependant information may be hard-coded or provided by a user.

At block 402, processing logic creates a statement array for a source code file of a first program. At block 403, processing logic creates a comment array for a source code file of a second program. Processing logic at blocks 402 and 403 may create the above arrays using the program language dependant information.

At block 404, processing logic compares the statement array of the first source code file to the comment array of the second source code file, and creates a list of similar strings. Processing logic uses the number of similar statements and comments to generate a similarity score.

At block 405 processing logic generates a report based on the comparison.

Figure 5:
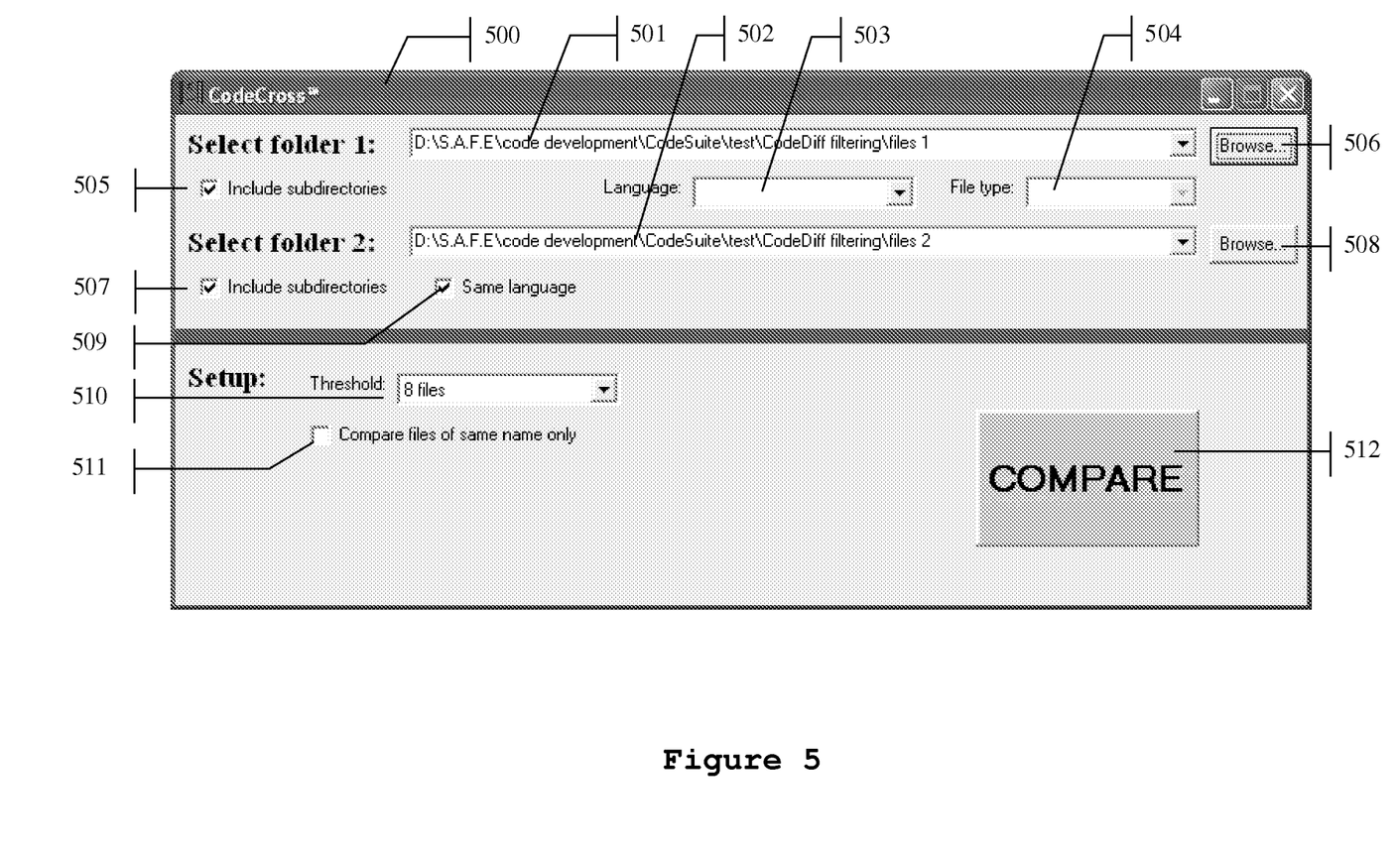
FIG. 5 illustrates a user interface of one embodiment of the invention.

FIG. 5 shows one embodiment of a user interface for the present invention. The user interface screen 500 contains a number of fields for accepting user input. Folder1 field 501 allows the user to type a path to a folder containing source code files of the original program to be compared. Alternatively, the user can click on browse button 506 that will allow the user to browse folders and select one that will be automatically entered into folder1 field 501. The user selects a programming language from the drop-down list 503 of known computer programming languages. The user selects a file type or list of file types containing source code from drop-down list 504. Alternatively the user can type a file type or list of file types into field 504. If the user checks checkbox 505, source code files in all subdirectories of folder1 will also be considered as part of the original program and will be used in the comparison.

Folder2 field 502 allows the user to type a path to a folder containing source code files of the suspected copied program to be compared. Alternatively, the user can click on browse button 508 that will allow the user to browse folders and select one that will be automatically entered into folder2 field 502. If the user checks checkbox 507, source code files in all subdirectories of folder2 will also be considered as part of the suspected copied program and will be used in the comparison. If the user checks checkbox 509, the programming language selected in drop-down list 503 and file types specified in field 504 will also be used for the files specified in folder2. If the user does not check checkbox 509, another language drop-down box and file type field will appear, allowing the user to specify a different programming language and different file types to be considered for the second set of files.

Threshold dropdown box 510 allows a user to select how many files to be reported. For example, if a user selects a threshold of 8 files and 9 files in folder2 have comments that are similar to statements in a file in folder1, only the 8 files with the highest similarity scores will be reported. It may be necessary to arbitrarily choose among the files to be displayed if, for example, files 8 and 9 have the same similarity score. The threshold is used to limit the size of the reports that are generated.

If checkbox 511 is checked, then the comparison only compares a file in folder2 that has the same name as a file in folder1. This is done because sometimes file names are not changed when they are copied. This speeds up the comparison process but will miss cases where file names have been changed or code was moved from one file to another.

The user clicks on compare button 512 to begin the comparison process.

Figure 6A:
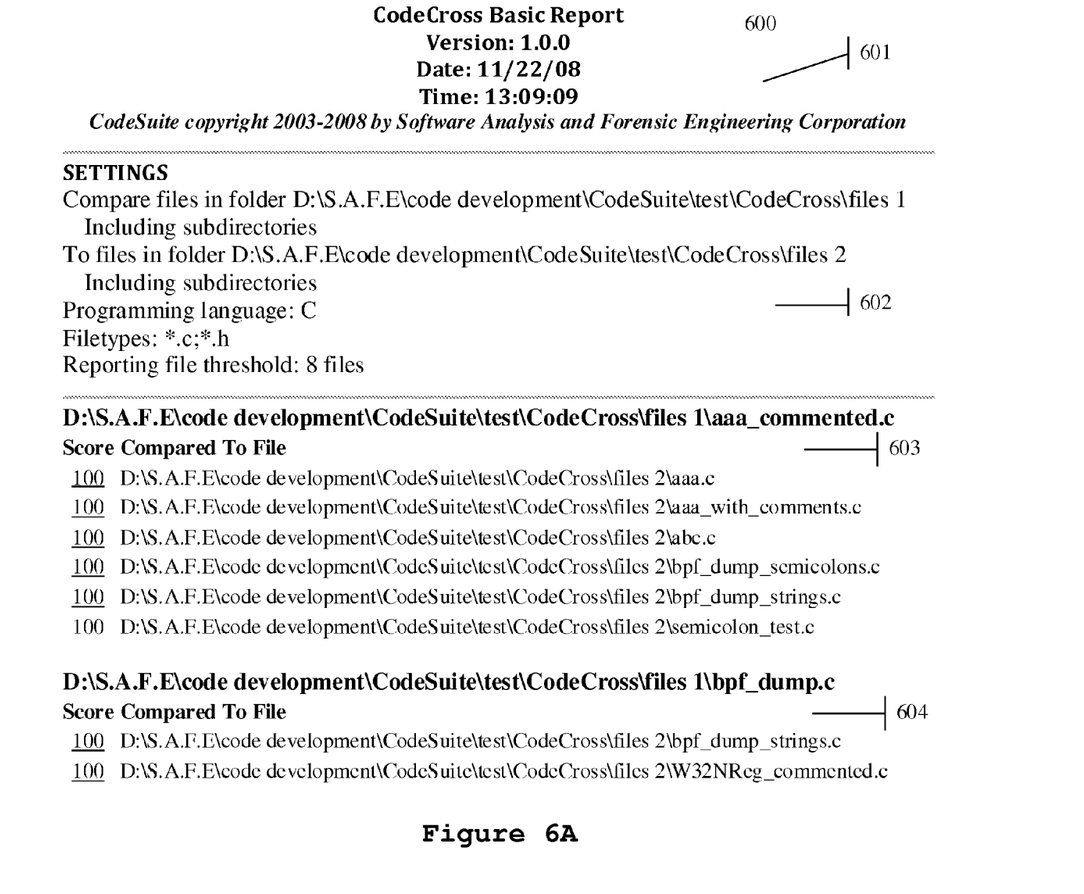
FIG. 6 illustrates a basic report and a detailed report, output in accordance with one embodiment of the invention.
Figure 6B:
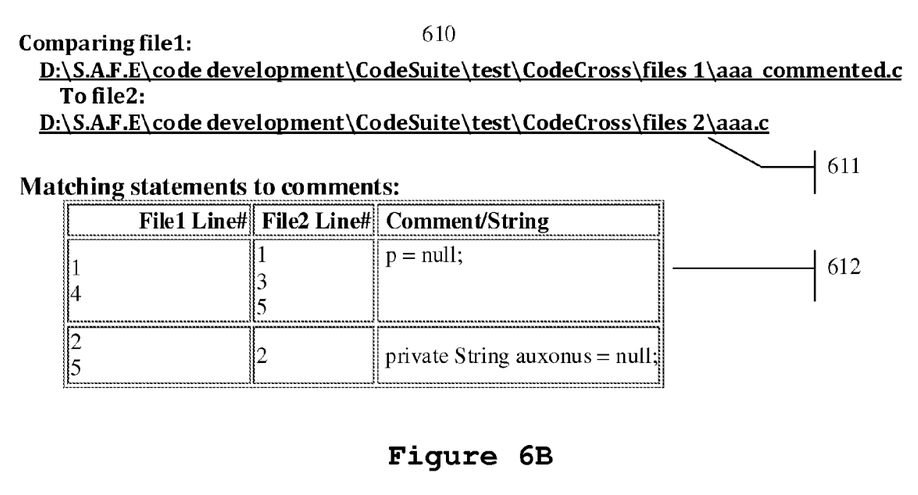

FIG. 6A and FIG. 6B illustrate sample reports generated by one embodiment of the present invention, indicating possible plagiarism. Referring to FIG. 6A, an HTML output report 600 includes a list of file pairs ordered by their total correlation scores. The report 600 includes a report description 601, a header 602 showing the chosen settings, and rankings of file pair matches 603 and 604 based on their similarity scores.

Each correlation score on the left in sections 603 and 604 is also a hyperlink to a detailed report for that particular file pair.

FIG. 6B illustrates a detailed report 610 showing similar statements and comments in a specific file pair. In this way, experts are directed to suspicious similarities and allowed to make their own judgments. The detailed report 610 includes a header 611 that tells which files are being compared. Furthermore, the detailed report includes a detailed description of the statements in file1 that matched comments in file2 as shown in the table 612.

Figure 7:
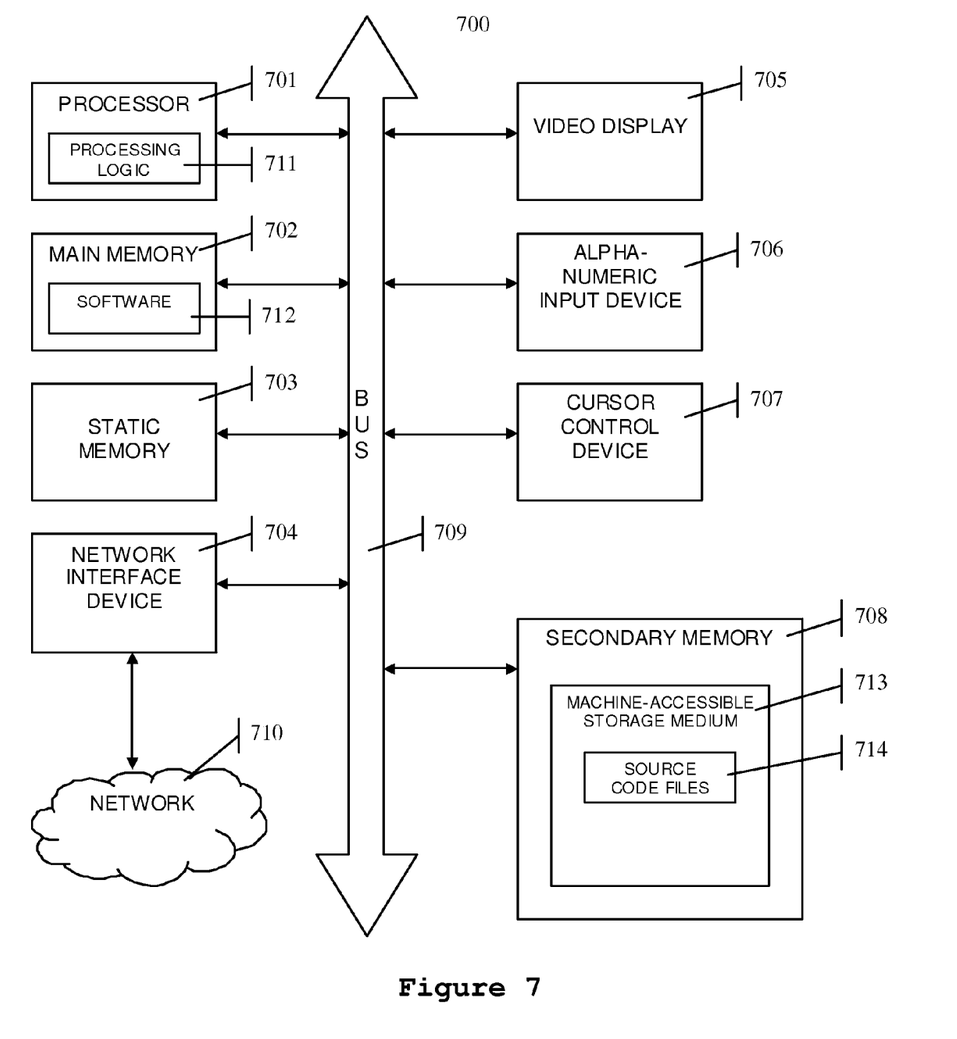
FIG. 7 illustrates a block diagram of an exemplary computer system, in accordance with one embodiment of the invention.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 701, a main memory 702 (e.g., read-only memory (ROM), flash memory, dynamic random access memory (DRAM) such as synchronous DRAM (SDRAM) or Rambus DRAM (RDRAM), etc.), a static memory 703 (e.g., flash memory, static random access memory (SRAM), etc.), and a secondary memory 708 (e.g., a data storage device), which communicate with each other via a bus 709.

Processor 701 represents one or more general-purpose processing devices such as a microprocessor, central processing unit, or the like. More particularly, the processor 701 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 701 may also be one or more special-purpose processing devices such as an application specific integrated circuit (ASIC), a field programmable gate array (FPGA), a digital signal processor (DSP), network processor, or the like. Processor 701 is configured to execute the processing logic 711 for performing the operations and steps discussed herein.

The computer system 700 may further include a network interface device 704. The computer system 700 also may include a video display unit 705 (e.g., a liquid crystal display (LCD) or a cathode ray tube (CRT)), an alphanumeric input device 706 (e.g., a keyboard), and a cursor control device 707 (e.g., a mouse).

The secondary memory 708 may include a machine-accessible storage medium (or more specifically a machine-accessible storage medium) 713 on which is stored one or more sets of instructions embodying any one or more of the methodologies or functions described herein. The software 712 may reside, completely or at least partially, within the main memory 702 and/or within the processor 701 during execution thereof by the computer system 700, the main memory 702 and the processor 701 also constituting machine-accessible storage media. The software 712 may further be transmitted or received over a network 710 via the network interface device 704.

The machine-accessible storage medium 708 may also be used to store source code files 714. While the machine-accessible storage medium 713 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing or encoding a set of instructions for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

The invention claimed is:

1. A computer-implemented method comprising:
    creating, by a computer system, a first array of lines of functional program code from a first program source code file, the first program source code file including the lines of functional program code of a first program and lines of non-functional comments of the first program;
    creating, by the computer system, a second array of lines of non-functional comments from a second program source code file, the second program source code file including lines of functional program code of a second program and lines of non-functional comments of the second program, wherein the second array of non-functional comments is created using a predefined list of special characters to determine the beginning and end of comments in the second program source code file;
    calculating, by the computer system, a code-to-comment similarity number based on performing a comparison of the lines of functional program code from the first array with the lines of non-functional comments from the second array to find instances of similarity, wherein calculating the code-to-comment similarity number comprises finding a number of matching functional program code statements in the first array and non-functional comments in the second array indicating that the non-functional comments of the second program source code file contain functional program code of the first program source code file; and
    presenting to a user an indication of disguised copying of the first program source code file wherein said indication of disguised copying is defined by the similarity number.

2. The method of claim 1 wherein:
calculating the code-to-comment similarity number comprises finding a number of matching lines in the first and second arrays weighted by the number of characters in the matching lines.

3. The method of claim 1 wherein:
calculating the code-to-comment similarity number comprises finding a number of lines in the first and second arrays that have an edit distance less than a given threshold.

4. The method of claim 1, further comprising:
detecting a selection of a programming language for a second program source code file, wherein the predefined list is selected by the computer system in response to the selected programming language.

5. The method of claim 1, wherein:
creating the second array of lines of non-functional comments includes removing the special characters from the beginning or end of the non-functional comments from the second program source code file.

6. A non-transitory computer-readable storage medium storing executable instructions to cause a computer system to perform a method comprising:
creating a first array of lines of functional program code from a first program source code file, the first program source code file including the lines of functional program code of a first program and lines of non-functional comments of the first program;
creating a second array of lines of non-functional comments from a second program source code file, the second program source code file including lines of functional program code of a second program and lines of non-functional comments of the second program, wherein the second array of non-functional comments is created using a predefined list of special characters to determine the beginning and end of comments in the second program source code file;
calculating a code-to-comment similarity number based on performing a comparison of the lines of functional program code from the first array with the lines of non-functional comments from the second array to find instances of similarity, wherein calculating the code-to-comment similarity number comprises finding a number of matching functional program code statements in the first array and non-functional comments in the second array indicating that the non-functional comments of the second program source code file contain functional program code of the first program source code file; and
presenting to a user an indication of disguised copying of the first program source code file wherein said indication of disguised copying is defined by the similarity number.

7. The computer-readable storage medium of claim 6 wherein:
calculating the code-to-comment similarity number comprises finding a number of matching lines in the first and second arrays weighted by the number of characters in the matching lines.

8. The computer-readable storage medium of claim 6 wherein:
calculating the code-to-comment similarity number comprises finding a number of lines in the first and second arrays that have an edit distance less than a given threshold.

9. The computer-readable storage medium of claim 6, the method further comprising:
detecting a selection of a programming language for a second program source code file, wherein the predefined list is selected by the computer system in response to the selected programming language.

10. The computer-readable storage medium of claim 6, wherein:
creating the second array of lines of non-functional comments includes removing the special characters from the beginning or end of the non-functional comments from the second program source code file.

11. A computer-implemented apparatus comprising:
a computer; and
a source code matching program on the computer, wherein execution of the source code matching program causes the computer to perform a method comprising:
creating a first array of lines of functional program code from a first program source code file, the first program source code file including the lines of functional program code of a first program and lines of non-functional comments of the first program;
creating a second array of lines of non-functional comments from a second program source code file, the second program source code file including lines of functional program code of a second program and lines of non-functional comments of the second program, and wherein the second array of non-functional comments is created using a predefined list of special characters to determine the beginning and end of comments in the second program source code file;
calculating a code-to-comment similarity number based on performing a comparison of the lines of functional program code from the first array with the lines of non-functional comments from the second array to find instances of similarity, wherein calculating the code-to-comment similarity number comprises finding a number of matching functional program code statements in the first array and non-functional comments in the second array indicating that the non-functional comments of the second program source code file contain functional program code of the first program source code file; and
presenting to a user an indication of disguised copying of the first program source code file wherein said indication of disguised copying is defined by the similarity number.

12. The apparatus of claim 11 wherein:
calculating the code-to-comment similarity number comprises means for finding a number of matching lines in the first and second arrays weighted by the number of characters in the matching lines.

13. The apparatus of claim 11 wherein:
calculating the code-to-comment similarity number comprises finding a number of lines in the first and second arrays that have an edit distance less than a given threshold.

14. The apparatus of claim 11, the method further comprising:
detecting a selection of a programming language for a second program source code file, wherein the predefined list is selected by the computer system in response to the selected programming language.

15. The apparatus of claim 11, wherein:
creating the second array of lines of non-functional comments includes removing the special characters from the beginning or end of the non-functional comments from the second program source code file.

* * * * *